US009998062B2

(12) United States Patent
Nadarajan et al.

(10) Patent No.: US 9,998,062 B2
(45) Date of Patent: Jun. 12, 2018

(54) AXIAL FLUX PERMANENT MAGNET MACHINE

(71) Applicant: ROLLS-ROYCE plc, London (GB)

(72) Inventors: Sivakumar Nadarajan, Singapore (SG); Ellis F H Chong, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days. days.

(21) Appl. No.: 15/443,991

(22) Filed: Feb. 27, 2017

(65) Prior Publication Data
US 2017/0279400 A1    Sep. 28, 2017

(30) Foreign Application Priority Data
Mar. 24, 2016   (GB) .................................. 1605038.7

(51) Int. Cl.
*H02H 7/08* (2006.01)
*H02P 29/024* (2016.01)
*H02K 1/27* (2006.01)
*H02K 21/24* (2006.01)

(52) U.S. Cl.
CPC ......... *H02P 29/027* (2013.01); *H02K 1/2793* (2013.01); *H02K 21/24* (2013.01)

(58) Field of Classification Search
CPC .. H02P 20/027; H02K 11/2793; H02K 21/24; H02K 21/02; H02K 1/27; H02K 1/28; H02K 7/10
USPC .............. 318/832, 538, 540, 735, 730, 721; 310/268, 261.1, 49.08, 49.29, 49.39, 310/154.33
See application file for complete search history.

(56) References Cited

U.S. PATENT DOCUMENTS

| | | | | |
|---|---|---|---|---|
| 6,137,203 A | * | 10/2000 | Jermakian | ............ H02K 1/2793 |
| | | | | 310/191 |
| 9,584,056 B2 | * | 2/2017 | Ritchey | .................. H02K 16/00 |
| 2006/0290219 A1 | | 12/2006 | Rodger et al. | |
| 2010/0164422 A1 | * | 7/2010 | Shu | ...................... H02K 21/029 |
| | | | | 318/540 |
| 2012/0146445 A1 | * | 6/2012 | Tokoi | .................. H02K 21/026 |
| | | | | 310/156.37 |

FOREIGN PATENT DOCUMENTS

| | | | | |
|---|---|---|---|---|
| CH | 102136771 A | * | 7/2011 | ............... H02K 1/06 |
| CN | 102136771 A | | 7/2011 | |
| CN | 204334269 U | | 5/2015 | |
| CN | 204741386 U | | 11/2015 | |
| DE | 102005016365 A1 | | 12/2012 | |

OTHER PUBLICATIONS

Jul. 27, 2017 Search Report issued in Euorpean Patent Application No. 17158084.
Oct. 13, 2016 Search Report issued in British Patent Application No. 1605038.7.

* cited by examiner

*Primary Examiner* — Karen Masih
(74) *Attorney, Agent, or Firm* — Oliff PLC (57) ABSTRACT

An axial flux permanent magnet machine including a pair of axially spaced first components. A second component positioned axially between and equidistant from the first components. Either the pair of first components or the second component is arranged to rotate about a shaft. A translation mechanism coupled to each of the first components. The translation mechanism configured to translate the first components axially away from the second component. Also a method of controlling an axial flux permanent magnet machine.

11 Claims, 6 Drawing Sheets

AXIAL FLUX PERMANENT MAGNET MACHINE

The present disclosure concerns an axial flux permanent magnet machine. In particular it concerns fault mitigation to accommodate an inter-turn short circuit.

Axial flux permanent magnet machines may be used to drive motors or generators, actuators or pumps. For an aerospace application, for example in a gas turbine engine that powers an aircraft, an axial flux permanent magnet machine may drive an embedded motor; an embedded generator; an electrical actuator; or an electrically driven fuel or oil pump. In a marine application an axial flux permanent magnet machine may drive a propulsion motor. In a rail or land vehicle an axial flux permanent magnet machine may drive a direct drive generator. In a wind or tidal turbine application an axial flux permanent magnet machine may also drive a direct drive generator.

A problem faced with an axial flux permanent magnet machine is that the magnetic excitation of the rotor cannot be disabled. This means that in the event of a short circuit between turns of the stator windings a high circulating current is induced in the shorted turns. This increases the thermal stress on the insulation of the stator windings which consequently degrades rapidly and may lead to complete failure of the axial flux permanent magnet machine.

According to a first aspect of the invention there is provided an axial flux permanent magnet machine comprising:

a pair of axially spaced first components;
a second component positioned axially between and equidistant from the first components;
wherein either the pair of first components or the second component is arranged to rotate about a shaft; and
a translation mechanism coupled to each of the first components; the translation mechanism configured to translate the first components axially away from the second component.

Advantageously the axial distance between the first and second components, the air gap, is increased and consequently the magnetic reluctance is also increased. Advantageously the flux linkage is reduces which reduces the rate at which the insulation of stator windings is degraded. Advantageously the length of axial translation can be optimised to reduce the flux linkage to a suitably low level in an appropriately short period of time.

The translation mechanism may comprise springs and an actuator. The springs may be coupled to a damping arrangement or may incorporate damping. Advantageously such damping acts to retard the expansion of the springs to minimise or reduce axially oscillation in response to the force of the movement of the first components away from the second components. Advantageously the flux linkage is therefore reduced in a controlled and predictable manner.

The actuator may comprise an electromagnetic actuator. The actuator may comprise a mechanical actuator. The actuator may comprise a hydraulic actuator; the fluid may be fuel, oil or another fluid. The actuator may comprise a pneumatic actuator. There may be one actuator per spring, or one actuator coupled to both springs.

The first components may comprise a pair of rotors and the second component may comprise a stator. Alternatively the first components may comprise a pair of stators and the second component may comprise a rotor. Advantageously the axial flux permanent magnet machine as described is applicable to either of the common arrangements of axial flux permanent magnet machine.

The component or components that is arranged to rotate about the shaft (the rotor or rotors) may comprise two radially spaced annular arrays of permanent magnets and a retaining arrangement. The retaining arrangement may be configured in a first configuration to retain the magnet arrays in like-pole alignment and in a second configuration to release the magnet arrays to rotate to opposite-pole alignment. Advantageously the flux linkage of the machine is reduced in the second configuration.

The retaining arrangement may comprise a retractable pin. The retaining arrangement may comprise a retractable key. The retaining arrangement may comprise a pin or key which includes a predefined shear weakness arranged to cause the pin or key to break under a predefined shear load. Alternatively the retaining arrangement may comprise an interference fit between the first and second annular arrays of permanent magnets. Advantageously the retaining arrangement, howsoever constituted, acts to retain the magnet arrays in the first configuration for normal operation of the axial flux permanent magnet machine. A magnetic spring effect between the magnet arrays maintains the second configuration.

The axial flux permanent magnet machine may further comprise a controller. The controller may be electrical or mechanical. The controller may be configured to control the translation mechanism. The controller may be configured to control the actuator and/or springs. The controller may be further configured to control the retaining arrangement. Alternatively the retaining arrangement may be controlled by a different controller. Advantageously where the controller controls both the translation mechanism and the retaining arrangement it can phase the axial translation, to increase the air gap, and the magnetic short circuit. The controller may release the retaining arrangement before it actuates the translation mechanism. Advantageously the magnetic short circuit traps magnetic flux within the rotor and then the increased air gap prevents or reduces flux linkage between the rotor and stator. Advantageously the magnetic short circuit also reduces the axial force required to actuate the translation mechanism. Alternatively the controller may actuate the translation mechanism before the releasing the retaining arrangement. Alternatively the controller may actuate the translation mechanism simultaneously with releasing the retaining arrangement.

There is also provided a motor comprising an axial flux permanent magnet machine as described above; a generator comprising an axial flux permanent magnet machine as described above; an actuator comprising an axial flux permanent magnet machine as described above; or a pump comprising an axial flux permanent magnet machine as described above.

According to a second aspect of the invention there is provided a method of controlling an axial flux permanent magnet machine as described above, the method comprising steps to:

detect a current short circuit in the machine; and
actuate the translation mechanism to translate the first components axially away from the second component to reduce flux linkage.

Advantageously the step to actuate of the translation increases the air gap and therefore increases the magnetic reluctance between each of the first components and the second component.

The method may comprise a step before the actuation step to release the retaining arrangement to magnetically short circuit the arrays of permanent magnets. Advantageously by applying this step after the actuation step the magnetic short circuit traps the flux in the rotor before the flux linkage is reduced. Alternatively the step to release the retaining arrangement may occur simultaneously with or after the step to actuate the translation mechanism.

The method may comprise a step after the detection step to inject current to weaken the magnetic field of the axial flux permanent magnet machine. This injection step may occur before, simultaneously with or after the step to actuate the translation mechanism. This injection step may occur before, simultaneously with or after the step to release the retaining arrangement.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
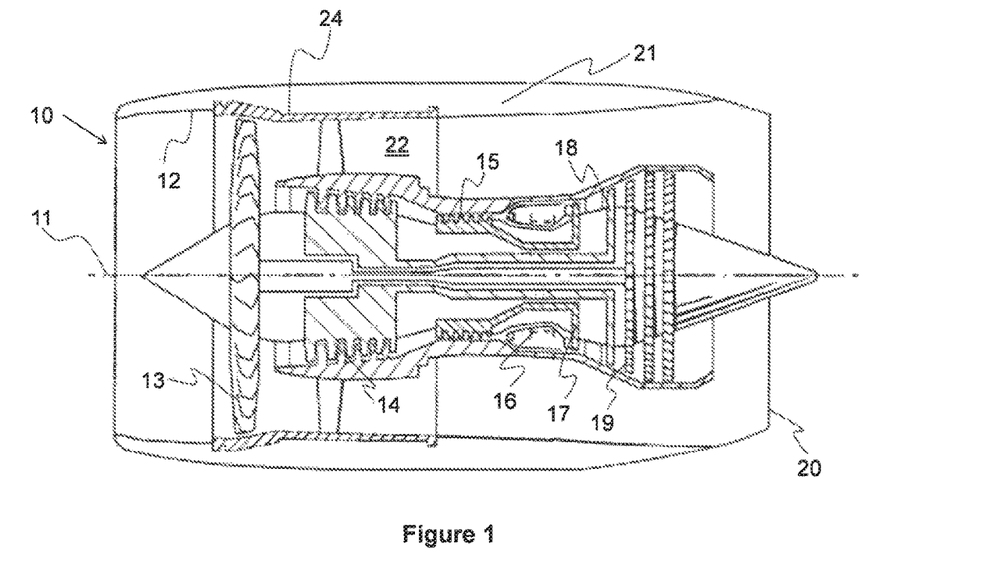
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 20 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

An axial flux permanent magnet machine is an electrical machine which has good reliability and high power density. However, in some fault conditions such a machine does not fail to a state which turns off the machine and protects its components from additional stress leading to complete failure. The present invention seeks to address any fault condition where there is a short circuit. Such a fault condition may include a short circuit between turns of the stator windings, turn to earth, terminal phase to phase, and terminal phase to neutral. Advantageously rapidly controlling short circuit faults, including inter-turn short circuit faults, minimises the likelihood of cascading failures such as demagnetisation and consequently reduces repair and maintenance costs. The damage may be limited to just the stator windings and so the axial flux permanent magnet machine can be repaired by simply rewinding the stator windings instead of having to replace other components as well.

Figure 2:
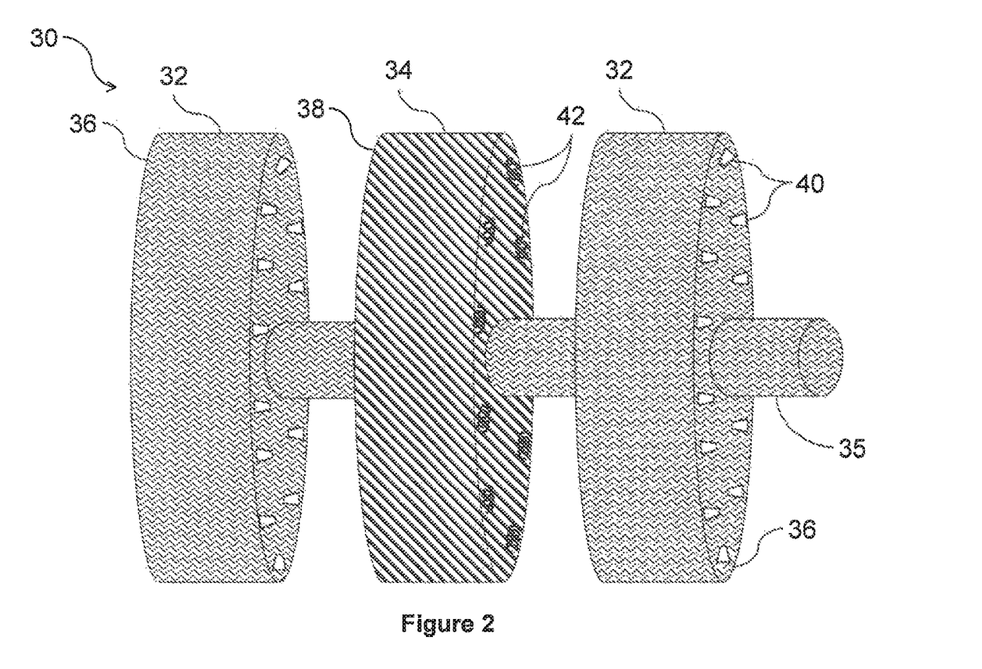
FIG. 2 is a schematic perspective view of a first embodiment of an axial flux permanent magnet machine.
Figure 3:
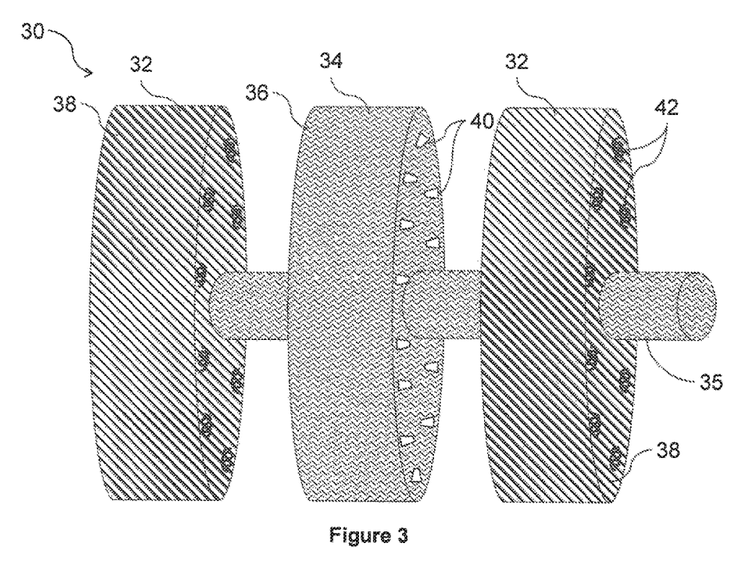
FIG. 3 is a schematic perspective view of a second embodiment of an axial flux permanent magnet machine.

An axial flux permanent magnet machine 30 is shown in FIG. 2 and FIG. 3. The axial flux permanent magnet machine 30 comprises a pair of first components 32 and a second component 34. The first components 32 are axially spaced and aligned about a common axis 35. The second component 34 is positioned axially between the first components 32 and is equally spaced from each of the first components 32. It is also aligned about the common axis 35.

In the first embodiment of the axial flux permanent magnet machine 30, FIG. 2, the first components 32 each comprise a rotor 36 and the second component 34 comprises a stator 38. In the second embodiment of the axial flux permanent magnet machine 30, FIG. 3, the first components 32 each comprise a stator 38 and the second component 34 comprises a rotor 36.

The rotor 36 or each rotor 36 comprises an annular array of permanent magnets 40. The magnets 40 may be embedded in or attached to the surface of the rotor 36. The poles of the permanent magnets 40 are aligned to the axial direction. Alternate magnets 40 show alternate poles thus forming a N-S-N-S sequence around the annular face of the rotor 36.

The stator 38 or each stator 38 comprises an annular array of windings 42, for example three-phase windings 42, on the annular faces of the stator 38. By sequentially exciting the windings 42 a rotating magnetic field is generated. The magnetic flux φ produced by the permanent magnets 40 interacts with the rotating magnetic field to produce torque. The magnetic flux φ that links axially between the rotor 36 and stator windings 42 is magnetic flux linkage λ. The magnetic flux linkage λ is proportional to the number of turns in the windings 42 and the magnetic flux φ. Back electromotive force, voltage, is proportional to the derivative of the magnetic flux linkage λ and inversely proportional to the air gap which the magnetic flux φ must traverse.

Figure 4:
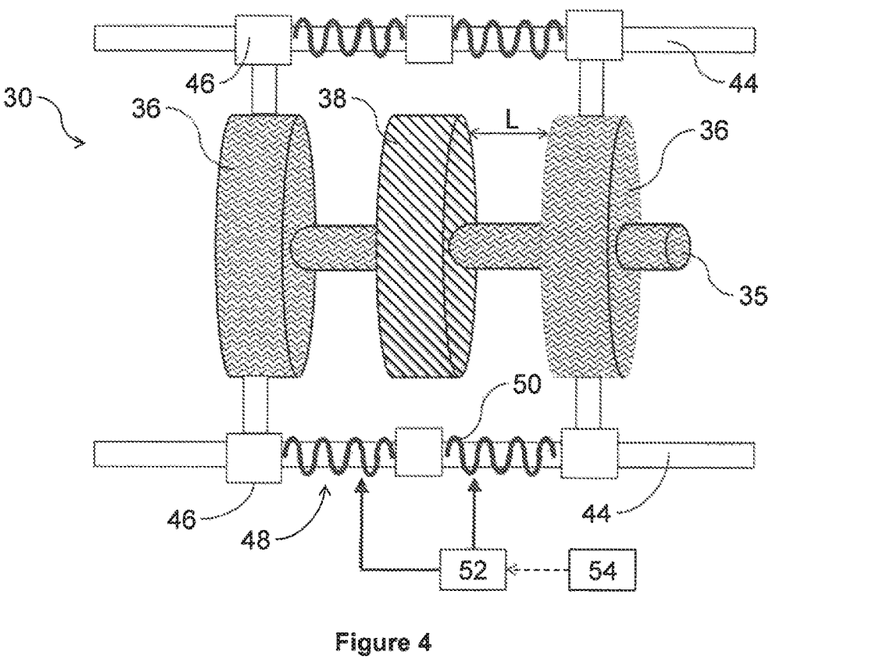
FIG. 4 is a schematic perspective view of the first embodiment in a first configuration.

The first embodiment of the axial flux permanent magnet machine 30 is shown in more detail in FIG. 4. It is shown in a first configuration which corresponds to normal operation of the axial flux permanent magnet machine 30. The stator 38 is connected to a pair of axially extending mounts 44 by a pair of radially or vertically extending mounting blocks 46. The common shaft 35 passes axially through the stator 38 and may be supported by suitable bearings. Each rotor 36 is axially spaced from the adjacent annular surface of the stator 38 by distance L as shown by the double-headed arrow.

The axial flux permanent magnet machine 30 also includes a translation mechanism 48. The translation mechanism 48 is shown in the form of a pair of springs 50. In the event of a short-circuit fault in the stator windings 42 the translation mechanism 48 is actuated to translate the rotors 36 axially away from the stator 38 to the second configuration, the positions shown in FIG. 5. The translation mechanism 48 moves each rotor 36 axially by a distance $\Delta L$ so that the distance between each rotor 36 and the adjacent annular surface of the stator 38 is $L+\Delta L$, as shown by the double-headed arrow.

Figure 5:
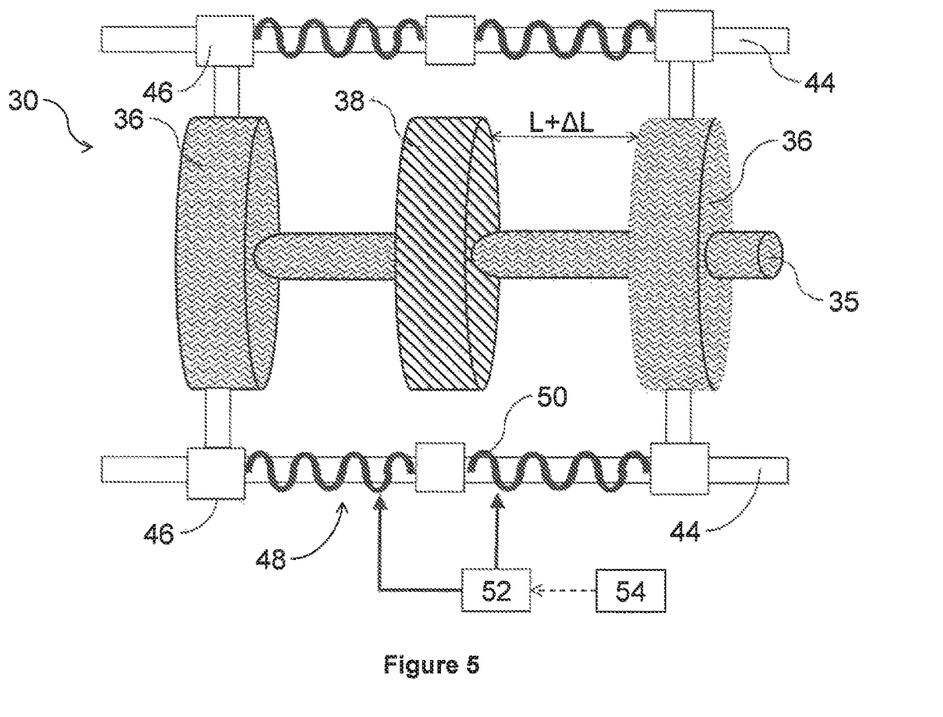
FIG. 5 is a schematic perspective view of the first embodiment in a second configuration.

By increasing the axial distance between the rotors 36 and the stator 38, the air gap, the magnetic reluctance is increased. Thus the flux linkage is reduced which advantageously reduces the rate at which the insulation of the stator windings 42 degrades. The axial distance $\Delta L$ can be optimised to reduce the flux linkage to a very low level in an appropriately short period of time.

The springs 50 may include a damping arrangement. The damping arrangement acts to retard the expansion of the springs 50 when the translation mechanism 48 is actuated so that the rotors 36 do not oscillate axially in response to the force of movement away from the stator 38. This means that the flux linkage reduces in a controlled (linear or non-linear) fashion without oscillation. Consequently damage to the insulation of the stator windings 42 is reduced or minimised.

The translation mechanism 48 may include an actuator 52. The actuator 52 is arranged to actuate the translation mechanism to cause the rotors 36 to translate axially away from the stator 38. The actuator 52 may be an electromagnetic actuator, a mechanical actuator, a hydraulic actuator, a fueldraulic or oil-draulic actuator, or a pneumatic actuator. There may be one actuator 52 arranged to actuate both springs 50 or there may be one actuator 52 for each spring 50.

The translation mechanism 48 may include a controller 54. The controller 54 is shown schematically and may be arranged to control the actuator 52 and/or the springs 50. The controller 54 may be electrical or mechanical.

Figure 6:
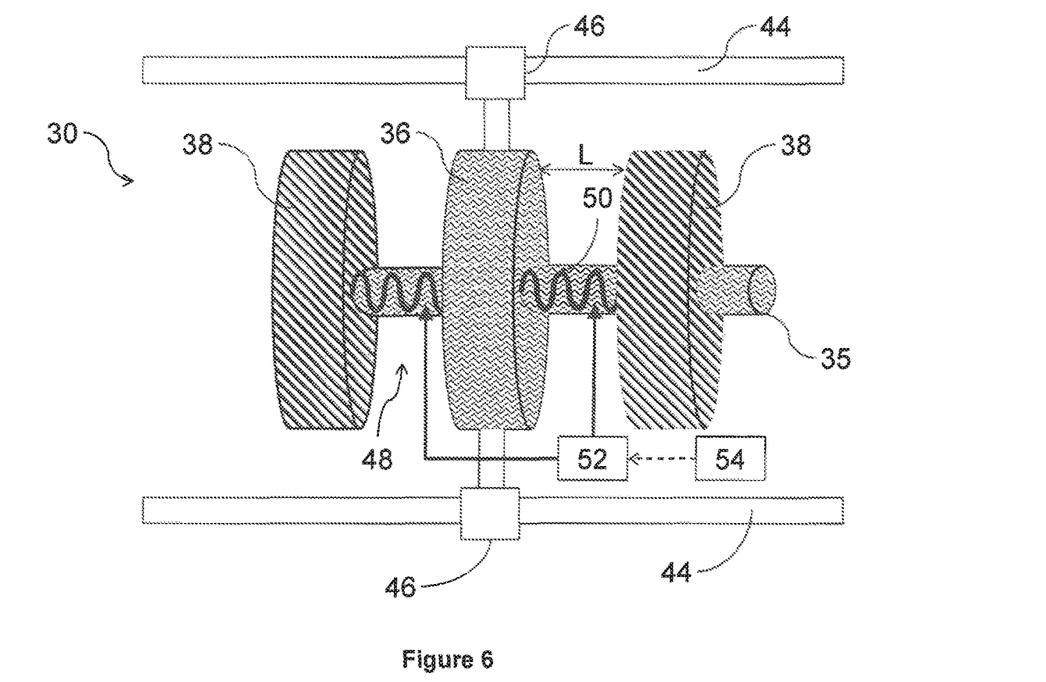
FIG. 6 is a schematic perspective view of the second embodiment in a first configuration.

The second embodiment of the axial flux permanent magnet machine 30 is shown in more detail in FIG. 6. It is shown in a first configuration which corresponds to normal operation of the axial flux permanent magnet machine 30. The stators 38 are each connected to a pair of axially extending mounts 44 by a pair of radially or vertically extending mounting blocks 46. The common shaft 35 may pass axially through one of the stators 38, to receive or deliver mechanical drive, and may be supported at the stators 38 by suitable bearings. The rotor 36 is equidistantly axially spaced from the adjacent annular surfaces of the stators 38 by distance L as shown by the double-headed arrow.

The axial flux permanent magnet machine 30 also includes a translation mechanism 48. The translation mechanism 48 is shown in the form of a pair of springs 50. In this second embodiment the springs 50 are positioned on or in the mounts 44. In the event of a short-circuit fault in the stator windings 42 the translation mechanism 48 is actuated to translate the stators 38 axially away from the rotor 36 to the second configuration, the positions shown in FIG. 7. The translation mechanism 48 moves each stator 38 axially by a distance $\Delta L$ so that the distance between each stator 38 and the adjacent annular surface of the rotor 36 is $L+\Delta L$, as shown by the double-headed arrow.

Figure 7:
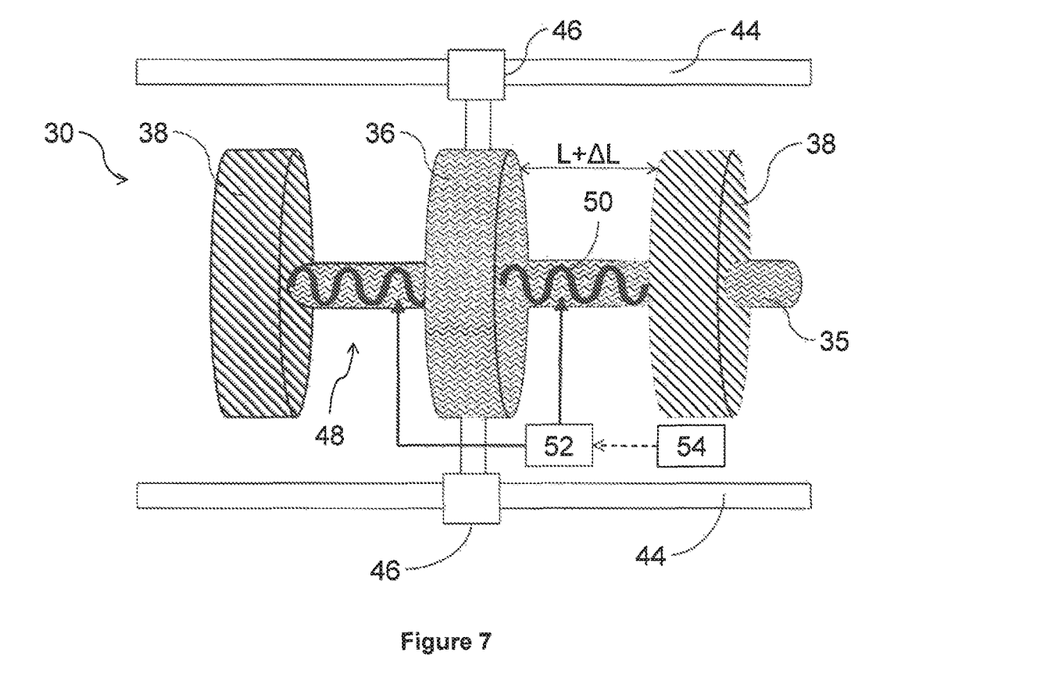
FIG. 7 is a schematic perspective view of the second embodiment in a second configuration.

By increasing the axial distance between the rotor 36 and the stators 38, the air gap, the magnetic reluctance is increased. Thus the flux linkage is reduced which advantageously reduces the rate at which the insulation of the stator windings 42 degrades. The axial distance $\Delta L$ can be optimised to reduce the flux linkage to a very low level in an appropriately short period of time.

The springs 50 may include a damping arrangement. The damping arrangement acts to retard the expansion of the springs 50 when the translation mechanism 48 is actuated so that the stators 38 do not oscillate axially in response to the force of movement away from the rotor 36. This means that the flux linkage reduces in a controlled (linear or non-linear) fashion without oscillation. Consequently damage to the insulation of the stator windings 42 is reduced or minimised.

The translation mechanism 48 may include an actuator 52. The actuator 52 is arranged to actuate the translation mechanism to cause the stators 38 to translate axially away from the rotor 36. The actuator 52 may be an electromagnetic actuator or a mechanical actuator. There may be one actuator 52 arranged to actuate both springs 50 or there may be one actuator 52 for each spring 50.

The translation mechanism 48 may include a controller 54 as in the first embodiment.

Advantageously the axial flux permanent magnet machine 30 described is capable of reducing the damage caused by an inter-turn short circuit in the stator windings 42. This may improve the chance of repairing the axial flux permanent magnet machine 30 instead of having to replace it. It may also reduce the probability of damaging coupled or proximate components.

A further advantage is that the translation mechanism 48 can be made reversible. Where the cause of the short-circuit has been removed, or the faulted component replaced or repaired, it may be possible to actuate the translation mechanism 48, via the actuator 52 or otherwise, to return the first components 32 (rotors 36 in the first embodiment, stators 38 in the second embodiment) to the first configuration where they are close enough to the second component 34 (stator 38 in the first embodiment, rotor 36 in the second embodiment) for flux linkage. Thus the axial distance between each first component 32 and the second component 34 is reduced from $L+\Delta L$ to L.

Figure 8:
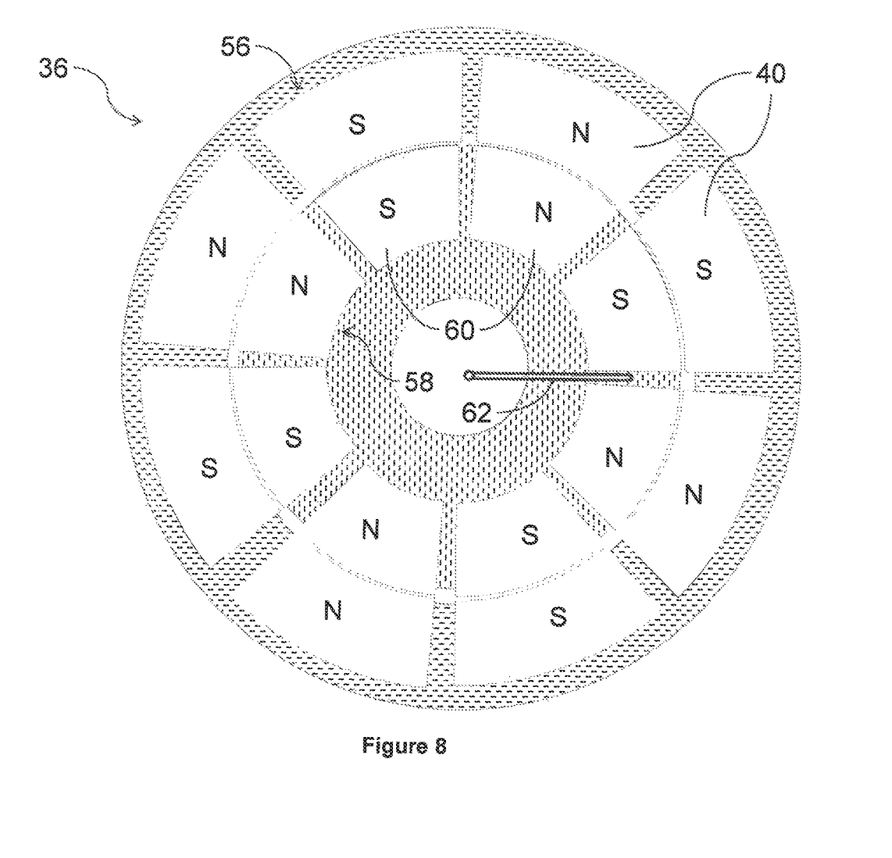
FIG. 8 is a schematic end view of a rotor of an axial flux permanent magnet machine in a first configuration.

A further method of reducing the flux linkage may be used in addition to the described translation of the first components 32 axially away from the second component 34. A modified rotor 36 is shown in FIG. 8 in a first configuration and in FIG. 9 in a second configuration. The rotor 36 includes a first annular array 56 of permanent magnets 40 as described above. The magnets 40 show alternate poles to form a N-S-N-S sequence around the face of the rotor 36.

The modified rotor 36 also has a second annular array 58 of permanent magnets 60. The second annular array 58 is radially inside the first annular array 56. The permanent magnets 60 of the second annular array 58 are also arranged to show alternate poles in a N-S-N-S sequence around the face of the rotor 36. In the first configuration (FIG. 8) which corresponds to normal operation the permanent magnets 58 of the second annular array 60 are arranged so that like poles (N-N or S-S) are radially aligned with the permanent magnets 40 of the first annular array 56.

The second annular array 60 of permanent magnets 58 may be held in the correct circumferential alignment by a retaining arrangement 62. The retaining arrangement 62 may be, for example, a retractable key or a releasable pin. Alternatively the retaining arrangement 62 may be an interference fit between the first and second annular arrays 56, 58 of permanent magnets 40, 60.

Figure 9:
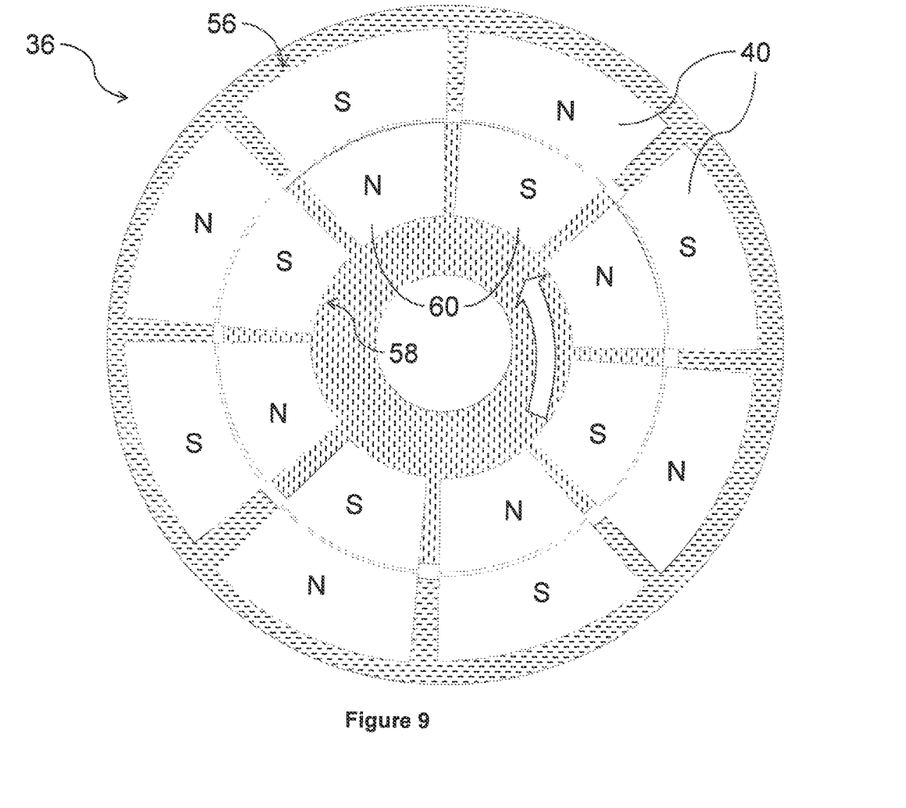
FIG. 9 is a schematic end view of a rotor of an axial flux permanent magnet machine in a second configuration.

The second configuration of the modified rotor 36 is shown in FIG. 9. In the second configuration the retaining arrangement 62 has been released. The retaining arrangement 62 may be released by being retracted or otherwise moved away from its retaining position. Alternatively it may be released by being broken, for example along a predefined shear weakness. This causes or permits the second annular array 58 of permanent magnets 60 to rotate relative to the first annular array 56 of permanent magnets 40 until opposite poles (N-S, S-N) are radially aligned. In this configuration of the modified rotor 36 there is a magnetic short circuit which prevents, or at least reduces the amount of, magnetic flux $\varphi$ from traversing axially to the stator 38. Instead the flux $\varphi$ is trapped within the rotor 36.

The force required to overcome the magnetic spring effect in the second configuration is large. Therefore, activating the magnetic realignment of the modified rotor 36 is unlikely to be reversible in an operational environment. Instead the modified rotor 36 or whole axial flux permanent magnet machine 30 would need to undergo maintenance or repair work in order to reset the circumferential alignment of the second annular array 58 of permanent magnets 60 relative to the first annular array 56. The retaining arrangement 62 could also be reapplied or replaced to hold the components of the modified rotor 36 in the first configuration.

The controller 54 may also be coupled to the retaining arrangement 62 in order to release it to move the modified rotor 36 from the first to the second configuration. An advantage of the controller 54 controlling the retaining arrangement 62 as well as the translation mechanism 48 is that the axial translation to increase the air gap and the magnetic short circuit can be phased relative to each other. For example the translation mechanism 48 may be actuated by the controller 54 after the retaining arrangement 62 is released by the controller 54. Thus the magnetic short circuit acts first to trap flux $\varphi$ within the rotor 36 and then the increased air gap acts to prevent or reduce flux linkage between the stator windings 42 and the permanent magnets 40. The force required to actuate the translation mechanism 48 is low because the short circuit causes the magnetic attraction between the stator 38 and rotor 36 to reduce. The translation mechanism 48 and retaining arrangement 62 may both be actuated by the controller 54 simultaneously.

Where the modified rotor 36, adapted to create a magnetic short circuit in its second configuration, is used in conjunction with the translation mechanism 48 the second annular array 58 of permanent magnets 60 need not be strong enough to entirely trap the magnetic flux $\varphi$.

The magnetic short circuit may alternatively be controlled by a different controller.

The axial flux permanent magnet machine 30 may also be arranged such that current can be injected to weaken the magnetic field before or in parallel with the translation mechanism 48 is actuated. Current injection may precede, follow or be in parallel with magnetic short circuit by release of the retaining arrangement 62.

An advantage of applying the magnetic short circuit and/or current injection before or in parallel with the axial translation of the first components 32 away from the second component 34 is that the magnetic flux $\varphi$ is reduced so that the amount of movement $\Delta L$ required to reduce the flux linkage to an acceptable level is also reduced. Consequently the actuator 52 and/or the springs 50 can be weaker or have less axial movement.

A method of controlling the axial flux permanent magnet machine 30 according to the present invention comprises a first step to detect a current short circuit in the axial flux permanent magnet machine 30. Particularly it comprises a step to defect a current short circuit in the stator windings 42.

The method comprises a second step to actuate the translation mechanism 48 to translate the first components 32 axially away from the second component 34 to reduce flux linkage.

Optionally the method may include a further step before or in parallel with the second step to release the retaining arrangement 62 to magnetically short-circuit the arrays 56, 58 of permanent magnets 40, 60. Optionally the method may include another step before or in parallel with the further step and before or in parallel with the second step to inject current to weaken the magnetic field of the axial flux permanent magnet machine 30.

Although the method has been described in relation to managing inter-turn short circuits it is also applicable to other types of short circuit including turn to earth, terminal phase to phase, and terminal phase to neutral.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An axial flux permanent magnet machine comprising:
a pair of axially spaced first components;
a second component positioned axially between and equidistant from the first components; and
a translation mechanism coupled to each of the first components, the translation mechanism being configured to translate the first components axially away from the second component;
wherein either the pair of first components or the second component is arranged to rotate about a shaft and comprises two radially spaced annular arrays of permanent magnets and a retaining arrangement, the retaining arrangement comprising a retractable pin or a key configured in a first configuration to retain the magnet arrays in like-pole alignment and in a second configuration to release the magnet arrays to rotate to opposite-pole alignment.

2. An axial flux permanent magnet machine as claimed in claim 1 wherein the translation mechanism comprises springs and an actuator.

3. An axial flux permanent magnet machine as claimed in claim 2 wherein the actuator comprises any one of the group consisting of an electromagnetic actuator, a mechanical actuator, a hydraulic actuator, a fueldraulic actuator, and a pneumatic actuator.

4. An axial flux permanent magnet machine as claimed in claim 1 wherein the pair of first components comprises a pair of rotors and the second component comprises a stator.

5. An axial flux permanent magnet machine as claimed in claim 1 wherein the pair of first components comprises a pair of stators and the second component comprises a rotor.

6. An axial flux permanent magnet machine as claimed in claim 1 further comprising a controller configured to control the translation mechanism.

7. An axial flux permanent magnet machine as claimed in claim 1 further comprising a controller configured to control the translation mechanism;
wherein the controller is further configured to control the retaining arrangement.

8. Any of the group consisting of a motor, a generator, an actuator, and a pump that comprises an axial flux permanent magnet machine as claimed in claim 1.

9. A method of controlling the axial flux permanent magnet machine including a pair of axially spaced first components, a second component positioned axially between and equidistant from the first components, and a translation mechanism coupled to each of the first components, the translation mechanism being configured to translate the first components axially away from the second component, wherein either the pair of first components or the second component is arranged to rotate about a shaft and comprises two radially spaced annular arrays of permanent magnets and a retaining arrangement, the retaining arrangement comprising a retractable pin or a key configured in a first configuration to retain the magnet arrays in like-pole alignment and in a second configuration to release the magnet arrays to rotate to opposite-pole alignment, the method comprising the steps of:

a) detecting a current short circuit in the axial flux permanent magnet machine;

b) releasing the retaining arrangement of the axial flux permanent magnet machine to magnetically short circuit the arrays of permanent magnets of the axial flux permanent magnet machine; and c) actuating the translation mechanism of the axial flux permanent magnet machine to translate the first components of the axial flux permanent magnet machine axially away from the second component of the axial flux permanent magnet machine to reduce flux linkage.

10. A method as claimed in claim 7 comprising a step following step a) of injecting current to weaken the magnetic field of the axial flux permanent magnet machine.

11. An axial flux permanent magnet machine as claimed in claim 1 further comprising a controller configured to control the translation mechanism;

wherein the controller is further configured to control the retaining arrangement.

* * * * *